Aug. 29, 1967     E. M. DEXTER     3,338,515
FLUID CONTROL DEVICE
Filed April 29, 1964     4 Sheets—Sheet 1
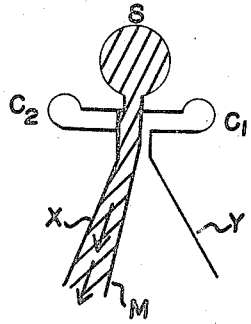
FIG. 1
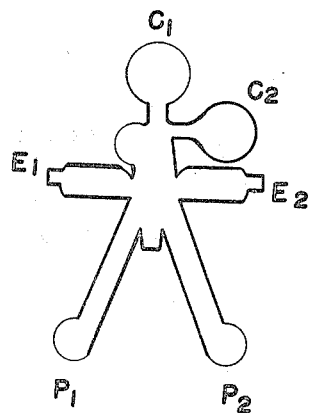
FIG. 1B
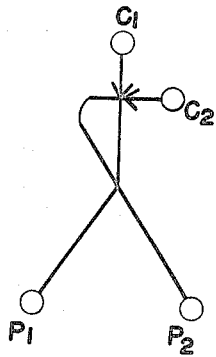
AND    FIG. 1A
FIG. 1C
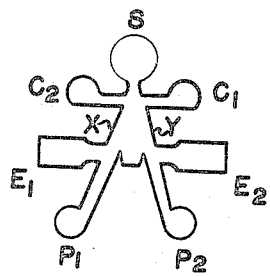
FIG. 1D
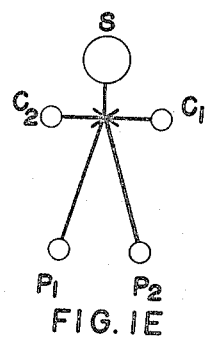
FLIP-FLOP
FIG. 1E
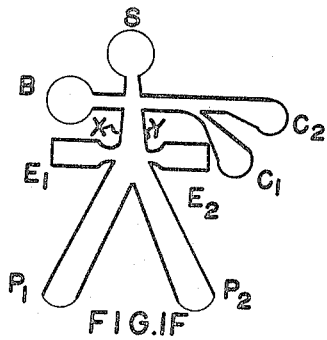
FIG. 1F
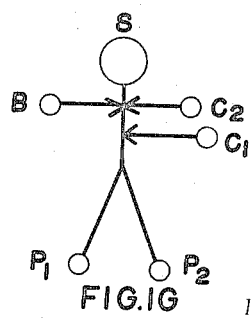
OR    FIG. 1G
INVENTOR.
EDWIN M. DEXTER
BY *J. T. Comfort*
ATTORNEY

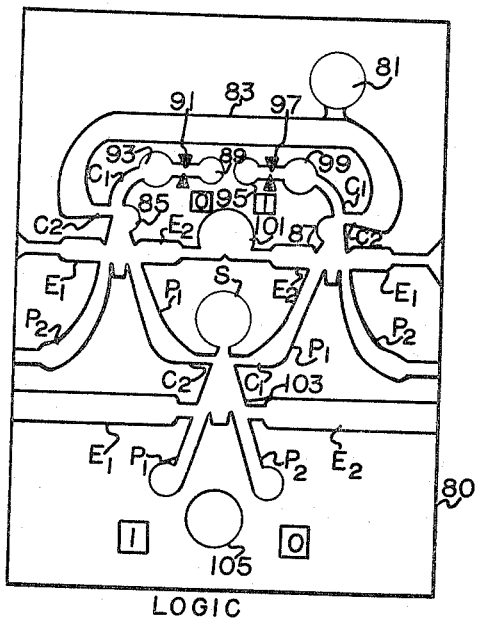
FIG.5
LOGIC
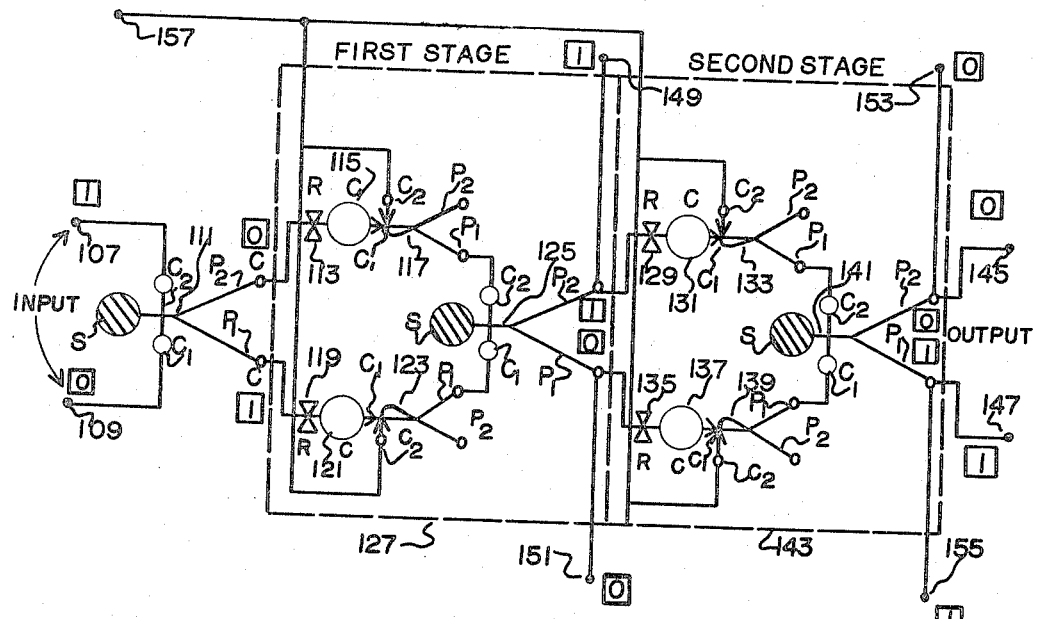
FIG.6: SHIFT REGISTER CIRCUIT USING DELAYS though this invention has been omitted from consideration.

United States Patent Office 3,338,515
Patented Aug. 29, 1967

3,338,515
FLUID CONTROL DEVICE
Edwin M. Dexter, Silver Spring, Md., assignor to General Electric Company, a corporation of New York
Filed Apr. 29, 1964, Ser. No. 363,532
5 Claims. (Cl. 235—201)

ABSTRACT OF THE DISCLOSURE

A fluid system has a plurality of fluid devices adapted to be maintained in one of two stable states. Each fluid device includes first and second fluid AND devices, with each AND device having two input ports, first and second output legs. The AND device produces an output on the first leg when an input signal is applied to one of the input ports and produces an output on the second leg when input signals are applied to both of the input ports. A fluid flip-flop included in each fluid device has a fluid power source, two output legs, a first input port connected to the second output leg of the first AND device and a second input port connected to second output leg of the second AND device. The fluid flow from the source is directed into one of the output legs until diverted into the other output leg upon the application of a fluid signal to the opposing input port. The stable stage of one fluid device is shifted to the next fluid device.

In another embodiment of the fluid system a delay is provided for delaying the response of a succeeding fluid device to change the state of a preceding fluid device until the previous state of the succeeding fluid device has been shifted.

---

This invention is directed to a fluid system composed of a plurality of fluid control devices, and more particularly to a fluid system capable of representing binary information therein. In the specific embodiment described herein the fluid system takes the form of a fluid controlled shift register operating in the binary form.

Very briefly then, a fluid system according to this invention comprises a plurality of fluid devices adapted to be maintained in one of two stable states. The stable state in which a fluid device is maintained may be shifted to the next fluid circuit. In one embodiment of this invention two fluid devices are used for each stage of the shift register with the stable states in the first fluid device of each stage shifted to the second fluid device before being shifted to the succeeding fluid shift register stage. In another embodiment only one fluid device is used for each stage of a shift register, with time delay means inserted between each fluid device to delay the response of a succeeding fluid device to changes in state of preceding fluid device until the previous state of the succeeding fluid device has been shifted.

It is therefore an object of this invention to provide a new and improved fluid system for representing binary information therein.

It is another object of this invention to provide a new and improved fluid shift register for handling binary information.

Another object of this invention is to provide a new and improved fluid system which operates with only one fluid circuit for each shift register stage.

The invention is set forth with particularity in the appended claims. The principles and characteristics of the invention, as well as other objects and advantages are revealed and discussed through the medium of the illustrative embodiments appearing in the specification and drawings which follow.

In the drawings:

FIGURE 1, which consists of FIGURES 1a through 1g shows the fluid circuit used in this fluid system.

FIGURE 5 shows a planar view of a fluid logic circuit used in a fluid shift register using one fluid bistable circuit for each stage of a fluid shift register.

FIGURE 6 is a schematic for a one fluid bistable element for each stage shift register using the fluid circuit shown in FIGURE 5, identified as a "delay type shift register."

Logic elements

Figure 3:
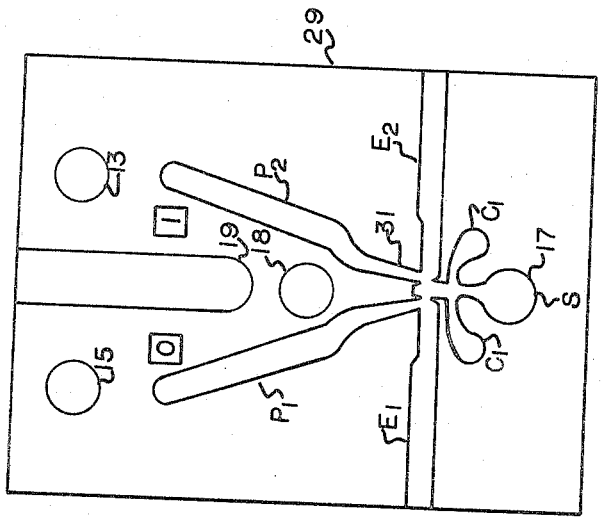
FIGURE 3 shows a planar view of the fluid amplifier used in the fluid shift register.

For illustrative purposes, the fluid devices are shown with open channels. Obviously in use the channels are closed with the fluid devices interconnected by either stacking them on each other with the input and output ports registering with each other, or by interconnecting the input and output ports by tubing.

The fluid devices used in this embodiment are shown in FIGURE 1. Fluid devices have been designed to function as analog, logic, and digital devices. This embodiment uses only logic and digital devices.

The underlying principle of operation of the logic and digital fluid device is a Coanda effect which holds that a fluid jet will attach to a wall placed adjacent to the fluid jet. In FIGURE 1a, a fluid jet M flows from the power source S into the channel bounded by walls X and Y. With two walls X and Y present, and with proper proportions, the fluid jet M will arbitrarily attach itself to one wall as it has attached itself to wall X, and remain attached if undisturbed.

An input flow applied to port $C_1$ does not disturb the fluid jet M, however, an input flow applied to port $C_2$ will detach the fluid jet from the wall X, and the fluid jet M will move over and attach itself to wall Y. The fluid jet M will remain attached to wall Y whether an input flow does or does not continue from input port $C_2$.

AND circuit

The device shown in FIGURE 1b is a plan view of an AND circuit. FIGURE 1c shows the symbolic representation for the AND circuit. Ports $E_1$ and $E_2$ are impedance matching ports, and do not enter into the logical operation of the device. When an input is applied to input port $C_1$ alone, or to input port $C_2$ alone, output flow occurs at output port $P_2$. When there are inputs at both input ports $C_1$ and $C_2$ an output flow occurs at output port $P_1$.

Flip-flop

A plan view of a flip-flop is shown in FIGURE 1d, and a symbolic representation of the flip-flop is shown in FIGURE 13. A continuous fluid jet from the power source S attaches itself arbitrarily to one wall of the central channel directing the jet flow into one leg $P_1$ or $P_2$, to provide an output from output port $P_1$ or $P_2$. An output flow applied to input port $C_1$ will cause the fluid jet to attach itself to wall X directing the jet flow from the input source S into leg $P_1$ to provide an output signal from the output port $P_1$. An input flow applied to input ports $C_2$ will cause the fluid jet to attach itself to wall Y directing the jet flow from the input source S into leg $P_2$ to provide an output signal from the output port $P_2$.

OR circuit

A plan view of an OR circuit is shown in FIGURE 1f, and a symbolic representation of the OR circuit is shown in FIGURE 1g. The fluid jet from the power source S is normally biased by a bias flow from the bias input B to attach itself to the wall Y of the central channel so that the fluid jet is directed into leg $P_2$ providing an output signal from the output port $P_2$. An input flow into port $C_1$ or $C_2$, both $C_1$ and $C_2$, will cause the fluid jet to detach itself from the wall X to direct the fluid jet into the $P_1$ leg to provide an output signal from the $P_1$ output port. When the input flow is removed from both of the input ports $C_1$ and $C_2$, the fluid jet returns to the Y wall under the control of the input bias flow from the bias port B to provide an output signal from the $P_2$ port.

In the following description the terms "signals" and "pulses" will be used to refer to fluid flows which are applied to input ports. The term signal will be used when the fluid flow is maintained for some length of time, and the term plus will be used when the fluid flow is applied to only a relatively short period of time.

*Secondary storage shift register*

Each shift register stage consists of two logic plates and two amplifier plates. The logic plate is laid out as shown in FIGURE 2, and the amplifier plate is laid out as shown in FIGURE 3.

Figure 2:
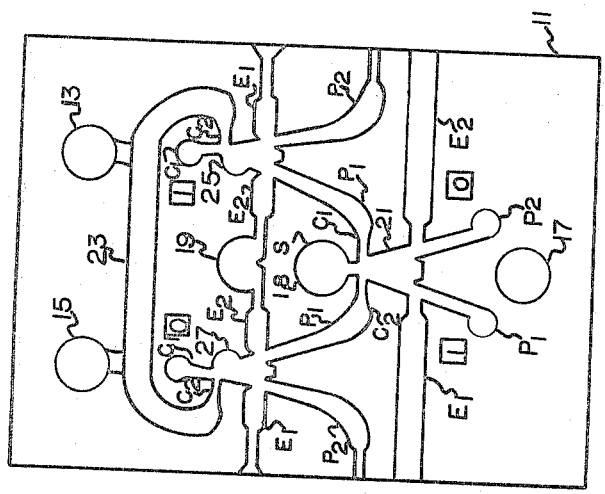
FIGURE 2 shows a planar view of a fluid logic circuit used in the fluid shift register circuit.

Referring now to FIGURE 2, the logic for one storage circuit for a stage is shown laid out on a logic plate 11. The logic plate is formed of suitable material such as metal, plastic or the like, which is slotted in a special configuration to provide passages for fluid. The various slots and configurations in the plate 11 may be formed in any suitable manner and may extend entirely through the plate, or may be of lesser depth as desired. In the illustrated embodiment, the slots in the plate 11 are shown extending only partially therethrough. A covering plate is positioned on the top side of the first plate to confine fluid to the various slots of the plate 11, and the plates are stacked on top of each other to confine the fluid in the various slots and configurations. The fluid utilized in the devices may assume a variety of forms. For example, the fluid may constitute a compressible fluid, such as air, to provide a pneumatic device. As a further example the fluid may be noncompressible, such as oil or water, to provide a hydraulic device. In this specific embodiment the fluid is air to provide a pneumatic device.

Ports 13, 15, and 19, and S of flip-flop 21 extend entirely through the logic plate 11 to the succeeding stacked amplifier and logic plates. Clock pulses are applied to ports 13 and 15 alternatively. Clock pulse port 13 is connected to channel 23 which connects to the $C_2$ input ports of AND circuits 25 and 27. Clock pulse port 15 is not connected to logic plate 11. Power jet port 17 is not connected to the logic plate 11, but is connected to the amplifier flip-flop shown in FIGURE 3. The $C_1$ input terminals of AND circuits 25 and 27 are connected to the outputs of the preceding amplifier. The $E_1$ exhaust ports of AND circuits 25 and 27 are connected to the outside atmosphere, and the $E_2$ exhaust ports are connected to a port 19 which is connected to the outside atmosphere. The $P_2$ output ports of AND circuits 25 and 27 are connected to the outside atmosphere, the $P_1$ output port of AND circuit 25 is connected to the $C_1$ input port of flip-flop 21, and the $P_1$ out-put port of AND circuit 27 is connected to the $C_2$ input port of flip-flop 21. The S fluid jet of flip-flop 21 is connected to a fluid power source. The $E_1$ and $E_2$ exhaust ports of flip-flop 21 are connected through the logic plate 11 to the power amplifier stacked below the logic plate 11.

Referring now to FIGURE 3, ports 13, 15, 17, 18, and 19 are the same ports shown in FIGURE 2 and extend through the amplifier plate 29. The fluid jet supply pressure manifold S (17) of the amplifier 31 is connected to an outside fluid power source. The amplifier plate 29 is stacked between two logic plates 11 as shown in FIGURE 2. In this manner the input ports $C_1$ and $C_2$ of the amplifier 31 are connected to the output ports $P_1$ and $P_2$ of the flip-flop 21 on the logic plate 11 and stacked above the amplifier plate 29, and the output ports $P_1$ and $P_2$, respectively, of the amplifier 31 are connected to the input ports $C_1$ of AND circuit 27 and input port $C_1$ of AND circuit 25 on the logic plate 11 in FIGURE 2 stacked below the amplifier 31. Exhaust ports $E_1$ and $E_2$ of the amplifier 31 are connected to the outside atmosphere.

The sealing gaskets are placed between the logic plates and the amplifier plates with proper holds therein to effect the indicated connection between the plates. The logic plates, the amplifier plates, and the gaskets are stacked to provide the proper interconnections.

The operation of the logic plate 11 in FIGURE 2 and the amplifier plate 29 in FIGURE 3 will be described now as a one storage circuit of a shift register stage. Assume for the purpose of this description that an input signal applied to input port $C_1$ of AND circuit 25 indicates a binary one, and an input signal applied to input port $C_1$ of AND circuit 27 indicates a binary zero.

A signal applied to input port $C_1$ of AND circuit 25 indicates a binary one. A clock pulse is applied to the clock pulse port 13 at a predetermined period of time to apply a pulse to the $C_2$ input ports of AND circuits 25 and 27. As AND circuit 25 has a signal applied to its $C_1$ input port at this time AND circuit 25 applies an output signal from its $P_1$ output port to the $C_1$ input port of flip-flop 21. AND circuit 27 with no signal applied to its $C_1$ input port continues to produce an output on its $P_2$ output port which is exhausted to the outside atmosphere.

Flip-flop 21 with a signal applied to its $C_1$ input port flips to its binary one state to produce an output signal from its $P_1$ output port. The output signal from the $P_1$ output port of flip-flop 21 is applied to the $C_1$ input port of the amplifier 31 in FIGURE 3 to switch that amplifier to its binary one state to produce an output signal from its $P_2$ output port. The output signal from the $P_2$ output port of the amplifier 31 is applied to the $C_1$ input port of the binary one AND circuit on the next logic plate.

A signal is applied to the $C_1$ input port of AND circuit 27 causes flip-flop 21 to apply a signal from its $P_2$ port to the $C_2$ port of amplifier 31 to switch this amplifier to its binary zero state.

Figure 4:
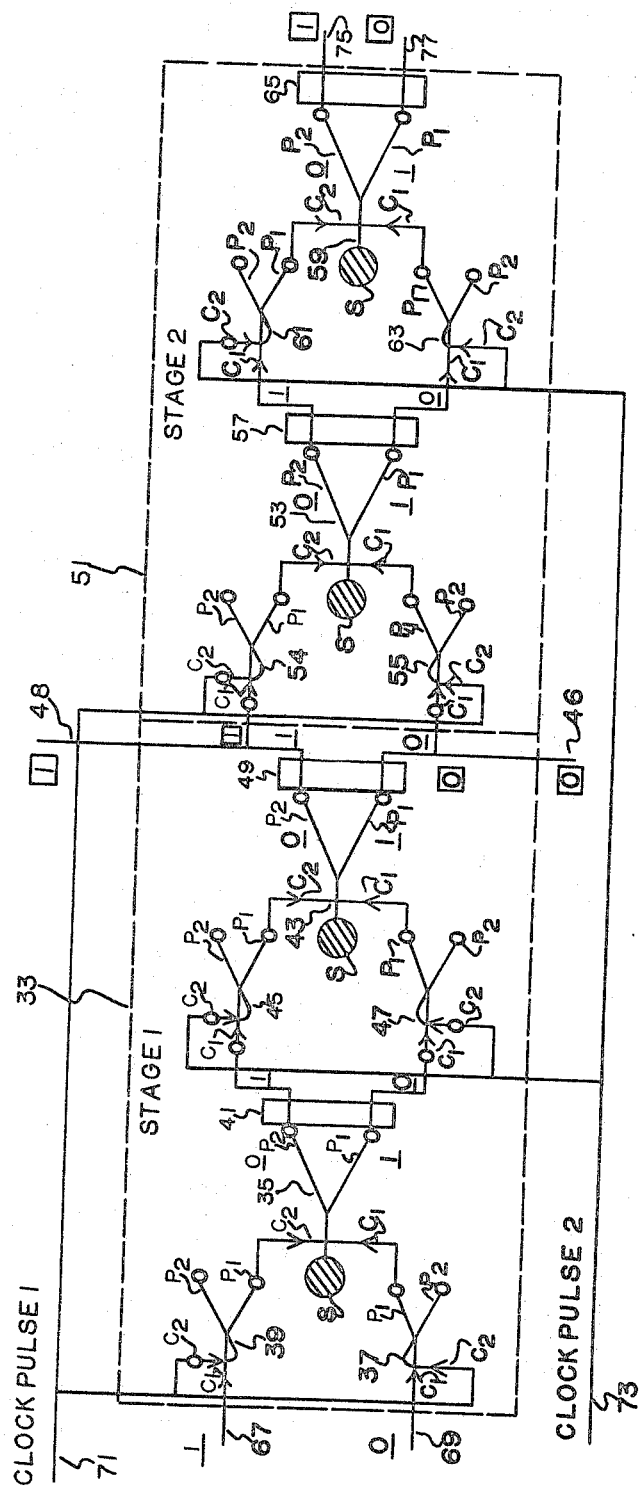
FIGURE 4 shows a schematic of a fluid shift register using two fluid circuits for each stage of a fluid shift register, identified as a "secondary storage shift register."

Referring now to FIGURE 4, a schematic of a two stage shift register is shown. The fluid logic elements are shown in symbolic form as shown in FIGURE 1. Each stage consists of two storage circuits such as shown and described in FIGURES 2 and 3. The first stage 33 has a first storage circuit consisting of a flip-flop 35, two input AND circuits 37 and 39, and amplifier 41, shown schematically. The intermediate storage circuit of the first stage 33 consists of a flip-flop 42, two input AND circuits 45 and 47, and amplifier 49.

The second stage 51 consists of two storage circuits. The first storage circuit consists of a flip-flop 53, two input AND circuits 54 and 55, and amplifier 57. The intermediate storage circuit consists of a flip-flop 59, two input AND circuits 61 and 63, and amplifier 65.

Each storage circuit is connected in a manner shown and described with relation to FIGURES 2 and 3. The $C_2$ input port of each AND circuit is connected to a clock pulse input port, and the $C_1$ input ports are connected to inputs or output ports of the preceding flip-flop. The $P_2$ output ports are exhausted to the atmosphere. The $P_1$ output ports of the AND circuits are connected to the input ports of the flip-flop. The output ports of the flip-flop are connected through an amplifier to the input ports of the AND circuits of the next storage circuit.

Input terminal 67 is a binary one terminal connected to the $C_1$ ports of AND circuit 39 in the first storage circuit of the first stage 33. Input terminal 69 is a binary zero terminal connected to the $C_1$ port of AND circuit 37 in the first storage circuit of the first stage 33. Input terminal 71 is a clock pulse 1 terminal which receives a clock pulse at a predetermined period of time and applies these clock pulse 1 pulses to the $C_2$ ports of AND circuits 37 and 39 of the first storage circuit in the first stage 33, and to the $C_2$ ports of AND circuits 54 and 55 of the first storage circuit of the second stage 51. Input terminal 73 is a clock pulse 2 terminal which receives a clock pulse at a predetermined period of time after the clock pulse received on clock pulse 1 and applies this clock pulse 2 pulse to the $C_2$ ports of AND circuits 61 and 63 of the intermediate storage circuit in the second shift register stage 51. A binary one output terminal 75 is connected to the $P_2$ output port of flip-flop 59 in the intermediate storage circuit of the second stage 51, and a binary zero output terminal 77 is connected to the $P_1$ output ports of flip-flop 59 through amplifier 65. A binary output terminal 48 is connected to the $P_2$ output port of flip-flop 43 and a binary zero output terminal 46 is connected to the $P_1$ output port of flip-flop 43 through amplifier 49 in the intermediate storage circuit in the first stage 33.

Operation

Signals are applied to input terminals 67 or 69 depending on what binary number is to be entered into the two stage shift register. Assume that the shift register has been previously cleared so that each stage 33 and 51 of the shift register is at a binary zero. Flip-flops 35, 43, 53, and 59 therefore produce a signal from their $P_2$ output ports. Amplifiers 41, 49, 57 and 65 invert the signals so that the zero output terminal 46 from the first stage 33 produces a signal indicating that the first stage contains a binary zero, and the zero output terminal 77 from the second stage 51 produces a signal indicating that the second stage contains a binary zero.

Assume that two binary ones are to be shifted into the two stage shift register shown in FIGURE 4.

TABLE 1

| Flip-Flops | 35 | 43 | 53 | 59 |
|---|---|---|---|---|
| | STAGE I | | STAGE II | |
| | First Storage | Intermediate Storage | First Storage | Intermediate Storage |
| Clock 1 } 1 | 1 | 0 | 0 | 0 |
| Clock 2 } | 1 | 1 | 0 | 0 |
| Clock 1 } 2 | 1 | 1 | 1 | 0 |
| Clock 2 } | 1 | 1 | 1 | 1 |
| Clock 1 } 3 | 0 | 1 | 1 | 1 |
| Clock 2 } | 0 | 0 | 1 | 1 |
| Clock 1 } 4 | 0 | 0 | 0 | 1 |
| Clock 2 } | 0 | 0 | 0 | 0 |

Step 1, clock pulse 1

A signal is applied to the binary one input terminal 67 applying a signal to the $C_1$ port of AND circuit 39. At clock pulse time 1 of step 1 a clock pulse is applied to terminal 71 applying a pulse to input ports $C_2$ of AND circuits 37 and 39, of the first stage 33, and to input ports $C_2$ of AND circuits 54 and 55 of the second stage 51. As AND circuit 39 has a signal applied to its $C_1$ input port, AND circuit 39 applies an output signal from its $P_1$ output to the $C_2$ input port of flip-flop 35 to set that flip-flop to a binary one, as shown in step 1, clock pulse 1 of Table 1. As soon as the clock pulse terminates AND circuit 39 stops producing a signal from its $P_1$ output port, and produces a signal on its $P_2$ output port again. Flip-flop 35, however, remains set to one, applies a signal from its $P_1$ output port, inverted by amplifier 41 and applied to the $C_1$ input port of AND circuit 45.

Step 1, clock pulse 2

At clock pulse 2 of step 1, a clock pulse is applied to terminal 73, applying a pulse to the $C_2$ input ports of AND circuits 45 and 47 of the first stage 33, and to the $C_2$ input ports of AND circuits 61 and 63 of the second stage 51. As AND circuit 45 has a signal applied thereto from the $P_1$ output port of flip-flop 35 as inverted by amplifier 41. AND circuit 45 applies a signal to the $C_2$ input port of flip-flop 43 to set that flip-flop to one. AND circuit 45 stops producing an out signal from its $P_1$ port as soon as the clock pulse finished. Flip-flops 35 and 43 are set to one at this time as indicated in clock 2, step 1 of Table 1. Flip-flop 43 applies a signal from its $P_1$ output port which is inverted by amplifier 49 and applied to the binary one output terminal 48 to indicate that the first stage 33 is set to one. The second stage remains reset to zero so that a signal is applied from the zero output terminal 77.

Step 2, clock pulse 1

To shift in the second binary one, a signal is applied to the binary one input terminal 67 applying a signal to the $C_1$ input port of AND circuit 39. This signal may be applied anytime after clock pulse 2 of step 1. At clock pulse 1 time of step 2, a clock pulse is applied to terminal 71, applying a pulse to the $C_2$ input ports of AND circuits 37 and 39, of the first stage 33, and the $C_2$ input ports of AND circuits 54 and 55 of the second stage 51. AND circuit 39 has a signal applied to its $C_1$ input port at this time from the input terminal 67 so it applies a signal from its $P_1$ output port to the $C_2$ input port of flip-flop 35 to set that flip-flop to one. AND circuit 54 has a signal applied to its $C_1$ input port from the $P_1$ output port of flip-flop 43 as inverted by amplifier 49 at this time so that it applies a signal from its $P_1$ output port to the $C_2$ input port of flip-flop 53 to set that flip-flop to one. AND circuits 39 and 54 stop producing output signals as soon as clock pulse 2 terminates, but flip-flops 35 and 53 remain set to one, and flip-flop 43 is already set to one. Thus, at clock time 1, step 2, the flip-flops are indicated in Table 1.

Step 2, clock pulse 2

At clock pulse 2 time of step 2, a clock pulse is applied to terminal 73, applying a pulse to the $C_2$ input ports of AND circuits 45 and 47 of the first stage 33, and to the $C_2$ input ports of AND circuits 61 and 63 of the second stage 51. As the $C_1$ input port of AND circuit 45 has a signal applied thereto from the $P_1$ output port flip-flop as inverted by amplifier 41, AND circuit 45 applies a signal to the $C_2$ input port of flip-flop 43 to set that flip-flop to one. The $C_1$ input port of AND circuit 61 has a signal applied thereto from the $P_1$ output port of flip-flop 53 as inverted by amplifier 57, so that AND circuit 61 applies a signal to the $C_2$ input port of flip-flop 59 to set that flip-flop to one. AND circuits 45 and 61 stop producing output signals as soon as clock pulse 2 terminates, but flip-flops 43 and 59 remain set to one. Thus, after step 2, clock pulse 2, flip-flops 35, 53, 43, 53, and 59 are set to one as shown in Table 1.

Output terminal 48 produces a signal indicating that the first stage 33 is set to a binary one, and output terminal 75 produces a signal indicating that the second stage 51 is set to a binary one.

Step 3, clock pulse 1

A signal is applied to the binary zero input terminal 69 applying a signal to the $C_1$ input port of AND circuit 37. At clock pulse 1 time of step 3 a clock pulse is applied to terminal 71, applying a pulse to the $C_2$ input ports of AND circuits 37 and 39 of the first stage 33, and to the $C_2$ input ports of AND circuits 54 and 55 of the second stage 51. AND circuit 37 has a signal applied to its $C_1$ input port at this time from the input terminal 69 so it applies a signal from its $P_1$ output port to the $C_1$ input port of flip-flop 35 to reset that flip-flop to zero. AND circuit 54 has a signal applied to its $C_1$ input port from the $P_1$ output port of flip-flop 43 through amplifier 49 so that it applies a signal from its $P_1$ output port to the $C_2$ input port of flip-flop 53 to set that flip-flop to a binary one. AND circuits 39 and 45 stop producing output signals as soon as the clock pulse 2 terminates, but flip-flop 35 remains reset to zero, and flip-flop 53 remains set to one. Flip-flops 43 and 59 remain set to one. The state of the flip-flops in the two stages 33 and 51 is as indicated in Table 1, step 3, clock pulse 1.

Signals are applied to the zero input terminal 69 and clock pulses applied to the clock pulse input terminals 71 and 73 as described above for clock pulse 2 of step 3, and clock pulses 1 and 2 of step 4 to clear the shift register as indicated in Table 1. The operation of the shift register is as described above.

*Logic plate layout for time delay shift register*

Referring now to FIGURE 5, each shift register stage of a one flip-flop per bit using an RC time delay between the stages consists of a logic plate 80. The logic plate is laid out as shown in FIGURE 5. The logic plate is similar to that shown in FIGURE 2, with two AND circuits and a flip-flop, but differs in the addition of two RC time delays. Restrictors and volumes produce an RC delay for incompressible fluids or gases; along line (i.e. a sonic delay) would be used for an incompressible fluid, or liquid.

Clock pulses are applied to the input port 81, which is connected by channel 83 to the input $C_2$ input ports of AND circuits 85 and 87. Zero signals are applied to input port 89, through a restriction 91, through a volume chamber 93 to the $C_1$ input port of AND circuit 85. One signals are applied to input port 95, through a restriction 97, through a volume chamber 99, to the $C_1$ input port of AND circuit 87. The restriction 91 and volume chamber 93 act to delay the fluid pulse or signal applied to input port 91 for a predetermined period of time depending on the size of the restriction 91 and the size of the volume chamber 93. The restriction 97 and volume chamber 99 act to delay the fluid pulse of signal applied to input port 95 for a predetermined period of time depending on the size of the restriction 97 and the size of the volume chamber 99.

The $E_1$ exhaust ports of AND circuits 85 and 87 are connected to the outside atmosphere, and the $E_2$ exhaust ports of AND circuits 85 and 87 are connected to port 101 which is connected to the outside atmosphere. The $P_2$ output ports of AND circuits 85 and 87 are connected to the outside atmosphere. The $P_1$ output port of AND circuit 85 is connected to the $C_2$ input port of flip-flop 103, and the $P_1$ output port of AND circuit 87 is connected to the $C_1$ input port of flip-flop 103. The $E_1$ and $E_2$ exhaust ports of flip-flop 103 are connected to the outside atmosphere. The $P_1$ and $P_2$ output ports of flip-flop 103 are connected to the input ports of an amplifier similar to that shown in FIGURE 3.

The logic plate for the one flip-flop per stage shift register using a restriction volume time delay between each flip-flop operates in the following manner. The clock pulse applied to the clock pulse input port 81 must last long enough to shift the information to that stage of the shift register, and should not last as long as the time delay imposed by the restriction volume chamber.

A signal is applied to input port 89 or 95 depending on the state of the previous stage of the shift register. Assume for the immediate purposes of this description that the previous stage of the shift register is set to one so that a signal has been applied to input port 95. This signal was delayed a predetermined period of time by the restriction 97 and the chamber 99 before being applied to the $C_1$ port of AND circuit 87. At clock pulse time a clock pulse is applied to input port 81 applying a pulse to the $C_2$ input ports of AND circuits 85 and 87. As the $C_1$ input port of AND circuit 87 has a signal applied thereto at this time, AND circuit 87 applies a signal from its $P_1$ output port to the $C_1$ input port of flip-flop 103 to set that flip-flop to a binary one. Because of the delay imposed on the output of flip-flop 103 by the restriction volume of the next logic stage, the new state of flip-flop 103 is not applied to the next stage of the shift register until after the clock pulse applied thereto has finished. Also because of the time delay imposed by the restrictions 91 and 97, and the volumes 93 and 99, the stage of the preceeding stage of the shift register is not applied to AND circuits 85 and 87 until the clock pulse applied to the $C_2$ input ports of AND circuits 85 and 87 has finished.

The above described operation is repeated with the application of the next clock pulse to the input port 81. Only two stages are shown, but any number may be connected in series as shown.

*One flip-flop per-stage shift-register*

Refer now to FIGURE 6 for a description of a two stage shift register having only one flip-flop per stage, and using restriction-volume delay elements. Input signals are applied to input terminal 109 for a binary zero. Input terminal 107 is connected to the $C_2$ input port and input terminal 109 is connected to the $C_1$ input port of flip-flop 111. The $P_2$ output port of flip-flop 111 is connected through restriction 113 and volume chamber 115 to the $C_1$ input port of AND circuit 117. The $P_1$ output port of flip-flop 111 is connected through restriction 119 and volume chamber 121 to the $C_2$ input port of AND circuit 123. The $P_1$ output port of AND circuit 117 is connected to the $C_2$ input port of flip-flop 125, and the $P_1$ output port of AND circuits 117 and 123 constitute the first stage 127.

The $P_2$ output port of flip-flop 125 is connected through restriction 129 and volume chamber 131 to the $C_1$ input port of AND circuit 133. The $P_1$ output port of flip-flop 125 is connected through restriction 135 and volume chamber 137 to the $C_1$ input port of AND circuit 139. The $P_1$ output port of AND circuit 133 is connected to the $C_2$ input port of flip-flop 141 and the $P_1$ output port of AND circuit 139 is connected to the $C_1$ input port of flip-flop 141. Flip-flop 141, and AND circuits 133 and 139 constitute the second stage 143.

A one output terminal 145 is connected to the $P_2$ output port of flip-flop 141, and a zero output terminal 147 is connected to the $P_1$ output port of flip-flop 141.

A binary one output terminal is connected to the $P_2$ output port of flip-flop 125, and a binary zero output terminal 151 is connected to the $P_1$ output port of flip-flop 125 for the first stage 127. A binary one output terminal 155 and a binary zero output terminal 153 are connected to the $P_2$ and the $P_1$ output ports, respectively, of flip-flop 141 for the second stage 143.

Clock pulses applied to the clock pulse terminal 157 are applied to the $C_2$ input ports of AND circuits 115, 123, 135 and 139.

Assume for the purposes of this immediate description that each flip-flop 111 and 125 of the first stage 127, and 141 of the second stage 143, are reset to zero as shown in step 1 of Table 2. Flip-flop 111 applies a signal from its $P_2$ output port to the $C_1$ input port of AND circuit 117, flip-flop 125 applies a signal from its $P_1$ output port to the $C_1$ input port of AND circuit 139, and flip-flop 141 applies a signal from its $P_2$ output port to the zero output terminal 145.

Then assume that a signal is applied to the one input terminal 107 applying a signal to the $C_2$ input port of flip-flop 111 to set that flip-flop to one. Flip-flop 111 then applies a signal from its $P_1$ output port, after a predetermined delay through restriction 119, and volume chamber 121, to the $C_1$ input port of AND circuit 123. A clock pulse is then applied to terminal 157 applying a pulse to the $C_2$ input ports of AND circuits 117, 123, 133, and 139. AND circuit 123 in the first stage 127 and AND circuit 139 in the second stage have signals applied to their $C_1$ input ports at this time, AND circuit 123 therefore applies a signal from its $P_1$ output port to the $C_1$ input port of flip-flop 125 to set that flip-flop to one. AND circuit 139 applies a signal from its $P_1$ output port to the $C_1$ input port of flip-flop 141 to reset that flip-flop to zero. The first stage 127 is now set to one, and the second stage 143 is reset to zero. A signal is delivered on output terminal 149 indicating that the first stage is set to one and a signal is delivered on output terminal 153 indicating that the second stage is reset to zero.

Before the next clock pulse a signal is applied to the one input terminal 107 to set flip-flop 111 to one, applying a signal to the $C_1$ input terminal of AND circuit 123 after a delay by the restriction 119 and volume chamber 121. Flip-flop 125 is now set to one, so after the delay by the restriction 129 and volume chamber 131, a signal is applied to the $C_1$ input port of AND circuit 133. At clock pulse time, a clock pulse is applied to terminal 157 applying signals to the $C_2$ input ports of AND circuits 117, 123, 133 and 139. AND circuits 123 and 133 have signals applied to their $C_1$ input ports at this time so that AND circuit 123 applies a signal to the $C_1$ input port of flip-flop 125 to set that flip-flop to one, and AND circuit 133 applies a signal to the $C_2$ input port of flip-flop 141 to set that flip-flop to one. Both stages 127 and 143 are thus set to one, so that output terminal 149 produces a signal indicating that the first stage 127 is set to one and output terminal 155 produces a signal indicating that the second stage 143 is set to one.

It can be seen that the function of the delay circuits consisting of a restriction and a volume chamber in the input circuit to the $C_1$ ports of the AND circuits serves to delay the effect of the change of the preceding flip-flop until the effect of the previous setting of the flip-flop has been shifted to the next flip-flop by the application of a clock pulse.

Only two stages and an input flip-flop are shown in FIGURE 6. It should be understood that any shift register may be constructed having large numbers of stages by connecting them in the manner shown.

While the invention has been explained and described with the aid of particular embodiments thereof, it will be understood that the invention is not limited thereby and that many modifications retaining and utilizing the spirit thereof without departing essentially therefrom will occur to those skilled in the art in applying the invention to specific operating environments and conditions. It is therefore contemplated by the appended claims to cover all such modifications as fall within the scope and spirit of the invention.

What is claimed is:

1. A fluid system comprising, a plurality of fluid devices adapted to be maintained in one of two stable states, each of said fluid devices including a first and second fluid AND devices, each AND device having two input ports, first and second output legs, said AND device producing an output on said first leg when an input signal is applied to one of said input ports, and producing an output on said second leg when input signals are applied to both of said input ports, including a fluid flip-flop having a fluid power source, two output legs, a first input port connected to said second output leg of said first AND device, and a second input port connected to said second output leg of said second AND device, with the fluid flow from the source directed into one of said output legs until diverted into the other output leg upon the application of a fluid signal to the opposing input port, and means for shifting the stable stage of one fluid device to the next fluid device.

2. A fluid system comprising, a plurality of fluid devices, each of said fluid devices having first and second fluid AND devices, said AND devices having two input ports, first and second output legs, said AND devices producing an output on said first leg when an input signal is applied to one of said input ports, and producing an output on said second leg when input signals are applied to both of said input ports, each of said fluid devices having a fluid flip-flop with a power source, first and second output legs, a first input port connected to said second output leg of said first AND device, a second input port connected to said second output leg of said second AND circuit, with the fluid flow from the source directed into said first output leg to establish a first stable state upon the application of a signal to said first input port and directed into said second output leg to establish a second stable state upon the application of a signal to said second input port, and means for shifting the stable state of one fluid device to the next fluid device.

3. A fluid system comprising a plurality of fluid devices, adapted to be maintained in one of two stable states, each of said fluid devices including a first and second fluid AND devices, each AND device having two input ports, first and second output legs, said AND device producing an output on said first leg when an input signal is applied to one of said input ports, and producing an output on said second leg when input signals are applied to both of said input ports, including a fluid flip-flop having a fluid power source, two output legs, a first input port connected to said second output leg of said first AND device, and a second input port connected to said second output leg of said second AND device, with the fluid flow from the source directed into one of said output legs until diverted into the other output leg upon the application of a fluid signal to the opposing input port, means for shifting the stable state of one fluid device to the next fluid device, and means associated with each of said fluid devices for delaying the response of a succeeding fluid device to changes in state of a preceding fluid device until the previous state of the succeeding fluid device has been shifted.

4. A fluid device comprising a plurality of fluid devices, adapted to be maintained in one of two stable states, each of said fluid devices including a first and second fluid AND devices, each AND device having two input ports, first and second output legs, said AND device producing an output on said first leg when an input signal is applied to one of said input ports, and producing an output on said second leg when input signals are applied to both of said input ports, including a fluid flip-flop having a fluid power source, two output legs, a first input port connected to said second output leg of said first AND device, and a second input port connected to said second output leg of said second AND device, with the fluid flow from the source directed into one of said output legs until diverted into the other output leg upon the application of a fluid signal to the opposing input port, means for shifting the stable state of one fluid device to the next fluid device, means for connecting said plurality of fluid devices in series, and means associated with each of said fluid devices for delaying the response of a succeeding fluid device to changes in state of a preceding fluid device until the previous state of the succeeding fluid device has been shifted.

5. A fluid system comprising a plurality of fluid devices, adapted to be maintained in one of two stable states, each of said fluid devices including a first and second fluid AND devices, each AND device having two input ports, first and second output legs, said AND device producing an output on said first leg when an input signal is applied to one of said input ports, and producing an output on said second leg when input signals are applied to both of said input ports, including a fluid flip-flop having a fluid power source, two output legs, a first input port connected to said second output leg of said first AND device, and a second input port connected to said second output leg of said second AND device, with the fluid flow from the source directed into one of said output legs until diverted into the other output leg upon the application of a fluid signal to the opposing input port, means for connecting said plurality of fluid devices in series, means for shifting the stable state of one fluid device to the next succeeding fluid device, and a constriction and a chamber in said means connecting a fluid device to a succeeding fluid device for delaying the response of a succeeding fluid device to changes in state of a preceeding fluid device until the previous state of the succeeding fluid device has been shifted.

References Cited

UNITED STATES PATENTS

| | | | |
|---|---|---|---|
| 3,128,039 | 4/1964 | Norwood | 137—81.5 |
| 3,193,197 | 7/1965 | Bauer | 137—81.5 X |
| 3,199,782 | 8/1965 | Shinn | 137—81.5 X |
| 3,201,041 | 8/1965 | Welsh | 137—81.5 X |
| 3,226,023 | 12/1965 | Horton | 137—81.5 X |
| 3,244,370 | 4/1966 | Colston | 137—81.5 X |

OTHER REFERENCES

H. D. L. Report, TR1114, Fluid Amplification, "Logic elements #9," E. V. Hobbs, Mar. 8, 1963, pp. 20, 21, 22, 23 and 24.

"Fluid Logic Shift Register With Intermediate Stages," I. B. M. Technical Disclosure Bulletin, H. R. Grubb, June, 1963, vol. #6, No. 1, pp. 24, 25.

M. CARY NELSON, *Primary Examiner.*

S. SCOTT, *Assistant Examiner.*